Dec. 15, 1936.  J. J. TAYLOR  2,064,636

VIBRATION DAMPER

Original Filed May 2, 1934

Inventor
John J. Taylor.
By Alpheus J. Crane
Attorney

Patented Dec. 15, 1936

2,064,636

UNITED STATES PATENT OFFICE 2,064,636

VIBRATION DAMPER

John J. Taylor, Wadsworth, Ohio, assignor to The Ohio Brass Company, Mansfield, Ohio, a corporation of New Jersey Original application May 2, 1934, Serial No. 713,659. Divided and this application December 17, 1935, Serial No. 54,861

11 Claims. (Cl. 173—13)

This invention relates to means for damping out vibrations in hollow conductors, such as are used for high potential transmission lines. The invention is also applicable to hollow bus bars and other hollow tubes or pipes subject to vibration.

One object of the invention is to provide a vibration damper which may be entirely enclosed in the member to which it is applied.

Another object of the invention is to provide a vibration damper which will not increase the liability to corona losses of charged members to which the damper is applied.

A further object of the invention is to provide a device of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

This application is a division of application Serial No. 713,659, filed May 2, 1934, Patent No. 2,028,930, dated January 28, 1936.

Conductors for high potential transmission lines are often made in the form of hollow tubes or tubular members in order to increase the size of the conductor for a given cross section of the material. This greatly diminishes the tendency for the formation of corona or electrical discharge for high potentials. Such conductors are subject to vibration, due chiefly to the effect of air currents. This tends to decrease the life of the conductor by producing fatigue adjacent its points of support. Various forms of hollow tubular members have been proposed for conductors of this kind.

Figure 1:
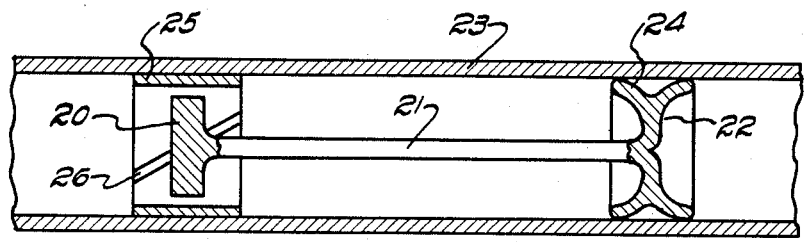
Fig. 1 is a sectional view of a portion of an electrical conductor having one embodiment of the present invention applied thereto.

In the form of the invention shown in Fig. 1, a weight 20 is supported on a spring arm 21 carried by a supporting block 22 disposed within the conductor 23. The block 22 has bearing skirts 24 which resiliently engage the interior of the conductor to hold the block in place. In this case, the energy of vibration is absorbed by impact of the weight 20 upon an impact ring 25. The ring 25 is preferably slit, as shown at 26 to permit sufficient compression to enable it to be inserted in the conductor and permit it to expand so as to be retained in place. This form of the invention may be inserted in the conductor during fabrication or after completion; the parts are compressible to permit insertion into position.

Figure 2:
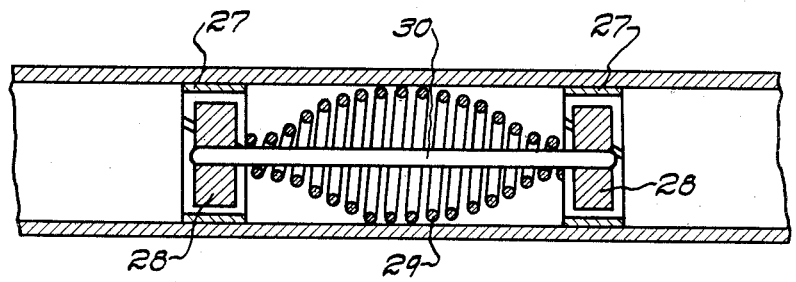
Fig. 2 is a view similar to Fig. 1 showing a modified form of the invention.

In the form of the invention shown in Fig. 2, two impact rings 27 are provided for each damper unit. A hammer or weight 28 is resiliently supported inside of each ring by means of a spring member 29 which resiliently carries a bar 30 to which the weights 28 are attached. It will be apparent that the spring member 29 may be readily contracted to permit its insertion in the conductor and the impact rings 27 being slit may also be compressed for assembly. The supporting blocks 22 and the impact rings 25 and 27 all form internal support members for the conductor, which not only serve the purpose of damping out vibrations but also act to prevent collapse of the conductor which in some forms of conductor is of great value.

The vibration dampers provided by the present invention being entirely enclosed within the conductor are not exposed to weather and hence are not impaired by corrosion or by sleet or other ice formation on the conductor and do not detract from the appearance of the line, nor do they increase the corona losses. Being of small size, they may be distributed along the conductor so as to provide energy absorbing means for damping out the conductor throughout its entire length.

It will be noted that the various weights 20 and 28 are resiliently poised so that any slight movement of the cable will flex the resilient support and produce relative movement between the weight and cable. The vibrations of a suspended conductor produced by air currents are in a vertical direction so that a loose weight carried by such a conductor and resting on a support fixed to the conductor will not ordinarily be moved relative to the conductor by conductor vibrations. For instance, if the conductor were partially filled with loose material, the vibrations ordinarily would not produce movement of the loose particles relative to the conductor for the reason that the particles would merely move up and down with the conductor. In order to displace the loose particles relative to the conductor, there would have to be a downward acceleration greater than the acceleration due to gravity, and most damage to conductors is produced by vibrations which do not reach this degree of acceleration. Where the weight is resiliently poised, however, as in the present invention, any slight vertical vibration of the conductor will cause relative movement and a consequent damping action.

I claim:—

1. The combination with an electrical conductor, of impact means carried by said conductor and operated by vibrations thereof for damping out said vibrations, said impact means comprising a weight, a spring supporting said weight on said conductor in poised, spaced relation thereto, said weight and conductor having normally spaced contact faces arranged to strike each other to produce an impact when said weight and conductor are relatively moved by vibration of said conductor.

2. The combination with an electrical conductor, of impact means carried by said conductor and operated by vibrations thereof for damping out said vibrations, said impact means comprising a spring, a poised weight supported by said spring and movable relative to said conductor when said conductor vibrates, and an impact surface on said conductor disposed in the path of movement of said weight.

3. The combination with a hollow conductor, of impact means disposed within said conductor for damping out vibrations thereof, said impact means comprising a weight, a spring supporting said weight in spaced relation to the wall of said conductor and in position to move relative thereto when said conductor is vibrated, said conductor and weight having impact surfaces in position to strike each other when said conductor and weight are relatively moved by vibration of said conductor.

4. The combination with a hollow conductor, of a support disposed within said conductor, a weight resiliently mounted on said support, and impact means in position to be struck by said weight when said conductor is vibrated.

5. The combination with a tubular conductor having its axis extending horizontally, of a coil spring disposed within said conductor, and a weight carried by said coil spring and movable relative to said conductor transversely of the axis of the said coil spring when said conductor is vibrated.

6. The combination with a hollow conductor, of a coil spring disposed within said conductor coaxial therewith and engaging the inner wall of said conductor, and a weight carried by said coil spring in spaced relation to the wall of said conductor to provide for relative movement of said conductor and weight, restrained by said spring for damping out vibrations of said conductor when said conductor is vibrated.

7. The combination with a hollow conductor, of a coil spring disposed within said conductor and coaxial therewith, the coil spring being tapered at its ends, a bar supported by said spring, a weight carried by said bar in spaced relation to the wall of said conductor to provide for relative movement of said weight and conductor, restrained by said spring, and an impact member in position to be struck by said weight when said conductor is vibrated.

8. The combination with a hollow conductor, of a support disposed within said conductor and held in fixed relation thereto by connection with the interior of said conductor, a weight carried by said support within said conductor and movable relative to said support, there being clearance space between said weight and the wall of said conductor providing for movement of said weight within said conductor in a direction transverse to the axis of said conductor, and an impact surface on said conductor disposed in the path of movement of said weight.

9. The combination with a hollow conductor, of a support disposed within said conductor and fixed thereto by connection with the interior of said conductor, a flexible member carried by said support, a weight mounted on said flexible member within said conductor for flexing said member when said conductor is accelerated, there being clearance space between said weight and the wall of said conductor providing for movement of said weight within said conductor in a direction transverse to the axis of said conductor, and an impact surface on said conductor disposed in the path of movement of said weight.

10. The combination with a hollow conductor, of a vibration damper arranged to be inserted into said conductor, a portion of said damper being contractible to permit insertion into said conductor, and expansible to engage said conductor after insertion to hold said portion in fixed relation to said conductor, a second portion of said damper being resiliently supported within said conductor by said first-named portion and movable relative to said conductor when said conductor is vibrated, and an impact surface disposed in the path of said second portion to impact therewith when said second portion is moved by vibration of said conductor to absorb the energy of vibration.

11. The combination with a hollow conductor of a contractible support arranged to be inserted into said conductor, said support being expansible to engage the interior of said conductor after insertion therein, vibration damping means carried by said support within said conductor, said means comprising a weight resiliently poised in said conductor on said support, and an impact surface fixed to said conductor and disposed in the path of movement of said weight.

JOHN J. TAYLOR.